(12) United States Patent
Sanzari

(10) Patent No.: US 9,945,740 B2
(45) Date of Patent: Apr. 17, 2018

(54) TWO WAVELENGTH OPTICAL INTERFEROMETRIC PRESSURE SWITCH AND PRESSURE TRANSDUCERS

(71) Applicant: KULITE SEMICONDUCTOR PRODUCTS, INC., Leonia, NJ (US)

(72) Inventor: Martin A. Sanzari, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 69 days.

(21) Appl. No.: 15/153,803

(22) Filed: May 13, 2016

(65) Prior Publication Data

US 2016/0334275 A1 Nov. 17, 2016

Related U.S. Application Data

(60) Provisional application No. 62/161,316, filed on May 14, 2015.

(51) Int. Cl.
*G01L 1/24* (2006.01)
*G01D 5/353* (2006.01)

(52) U.S. Cl.
CPC ............ *G01L 1/24* (2013.01); *G01D 5/35312* (2013.01)

(58) Field of Classification Search
CPC ........ G01S 17/06; G01S 7/4911; G01S 17/32; G01S 7/4814; G01S 7/4818; G01C 3/08; G01L 1/24; G01D 5/35312
See application file for complete search history.

(56) References Cited

U.S. PATENT DOCUMENTS

| | | | | |
|---|---|---|---|---|
| 5,276,501 A | * | 1/1994 | McClintock | G01D 5/266 250/227.19 |
| 5,301,001 A | * | 4/1994 | Murphy | G01D 5/268 250/227.27 |
| 5,392,117 A | * | 2/1995 | Belleville | G01D 5/266 250/227.27 |
| 5,929,990 A | * | 7/1999 | Hall | G01L 9/0079 356/478 |

(Continued)

*Primary Examiner* — Hwa Lee
(74) *Attorney, Agent, or Firm* — Troutman Sanders LLP; James E. Schutz; Mark Lehi Jones

(57) ABSTRACT

Certain implementations of the disclosed technology may include Fabry-Perot Interferometer (FPI)-based sensors systems and methods for measuring a desired stimulus. In accordance with an example implementation of the disclosed technology, a method is provided for receiving, by a Fabry-Perot Interferometer (FPI) sensor, first interrogation light having a first wavelength and second interrogation light having a second wavelength. The FPI sensor is configured to alter the received first interrogation light and the second interrogation light responsive to a measurement stimulus. The method includes detecting, by a first optical detector, a measurement signal responsive to receiving the altered first interrogation light and the altered second interrogation light from the FPI sensor, the measurement signal corresponding to the measurement stimulus. The method includes producing a measurement output signal, the measurement output signal representing an intensity of the measurement signal. The method further includes outputting the measurement output signal.

21 Claims, 13 Drawing Sheets

(56) References Cited

U.S. PATENT DOCUMENTS

| | | | |
|---|---|---|---|
| 7,016,047 B2 * | 3/2006 | May | G01D 5/35303 356/450 |
| 7,305,158 B2 * | 12/2007 | Jeffers | G01B 9/02007 356/477 |
| 7,773,231 B2 * | 8/2010 | Kinugasa | G01L 9/0079 356/478 |
| 2003/0142319 A1 * | 7/2003 | Ronnekleiv | G01D 5/35303 356/477 |
| 2007/0195328 A1 * | 8/2007 | Tan | G01J 3/26 356/454 |
| 2007/0292071 A1 * | 12/2007 | Zerwekh | E21B 47/06 385/12 |
| 2009/0225325 A1 * | 9/2009 | Lopushansky | G01D 5/268 356/480 |
| 2010/0128284 A1 * | 5/2010 | Riza | G01B 9/02004 356/519 |
| 2010/0245840 A1 * | 9/2010 | Vernooy | G01L 9/0079 356/519 |
| 2015/0019160 A1 * | 1/2015 | Thurner | G01B 9/02004 702/150 |
| 2015/0377765 A1 * | 12/2015 | Chilukuri | G01N 17/04 356/73.1 |

* cited by examiner

TWO WAVELENGTH OPTICAL INTERFEROMETRIC PRESSURE SWITCH AND PRESSURE TRANSDUCERS

CROSS REFERENCE TO RELATED APPLICATION

This application claims priority under 35 U.S.C. 119 to U.S. Provisional Patent Application No. 62/161,316, entitled "Two Wavelength Optical Interferometric Pressure Switch and Pressure Transducers," filed 14 May 2015, the contents of which are incorporated by reference in their entirety as if fully set forth herein.

FIELD

Example implementations of the disclosed technology relate to interferometric sensors, and in particular, to pressure switch and pressure transducer systems and methods that utilize two interrogation light wavelengths for disambiguation.

BACKGROUND

Fabry-Perot Interferometer (FPI)-based sensors can be used to measure environmental stimuli such as temperature, pressure, acceleration, etc. For example, external pressure changes may be utilized to deflect a diaphragm that is coupled to a reflective surface within the FPI cavity. By interrogating the cavity with light, a signal may be generated that corresponds to the pressure stimuli. The retrieved signals from FPI sensors typically correspond to optical interference intensity variations, which in turn, correspond to the measured phenomena as the sensor is subjected to environmental changes.

Some of the challenges involved in using traditional FPI sensors for pressure measurements include configuring the FPI to provide an accurate and unambiguous output signal, free of dead zones. A need exists for such systems and methods.

SUMMARY

Some or all of the above needs may be addressed by certain implementations of the disclosed technology. Certain implementations may include Fabry-Perot Interferometer (FPI)-based sensors systems and methods for measuring a desired stimulus.

In accordance with an example implementation of the disclosed technology, a method is provided for receiving, by a Fabry-Perot Interferometer (FPI) sensor, first interrogation light having a first wavelength and second interrogation light having a second wavelength. The FPI sensor is configured to alter the received first interrogation light and the second interrogation light responsive to a measurement stimulus. The method includes detecting, by a first optical detector, a measurement signal responsive to receiving the altered first interrogation light and the altered second interrogation light from the FPI sensor, the measurement signal corresponding to the measurement stimulus. The method includes producing a measurement output signal, the measurement output signal representing an intensity of the measurement signal. The method further includes outputting the measurement output signal.

Another method is provided that can include receiving, by a Fabry-Perot Interferometer (FPI) sensor, first interrogation light having a first wavelength and second interrogation light having a second wavelength. The FPI sensor is configured to alter the received first interrogation light and the second interrogation light responsive to a measurement stimulus. The method includes separating at least a portion of altered first interrogation light from altered second interrogation light; detecting, by a first optical detector, a first measurement signal responsive to receiving the separated and altered first interrogation light, wherein the first measurement signal corresponds to the measurement stimulus; detecting, by a second optical detector, a second measurement signal responsive to receiving the separated and altered second interrogation light, wherein the second measurement signal corresponds to the measurement stimulus; determining a measurement output signal, the measurement output signal representing a sum or difference of the first and second measurement signals; and outputting the measurement output signal.

A system is provided, according to an example implementation of the disclosed technology. The system can include a Fabry-Perot Interferometer (FPI) configured to receive a first interrogation light having a first wavelength and second interrogation light having a second wavelength. The FPI is configured to alter the received first interrogation light and the second interrogation light responsive to a measurement stimulus. The system can include a first optical detector configured to detect a measurement signal responsive to receiving altered first interrogation light and altered second interrogation light from the FPI, the measurement signal corresponding to the measurement stimulus. The system can also include at least one electronic component or processor configured to output a measurement output signal representing a quantity of the measurement stimulus.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

Figure 6:
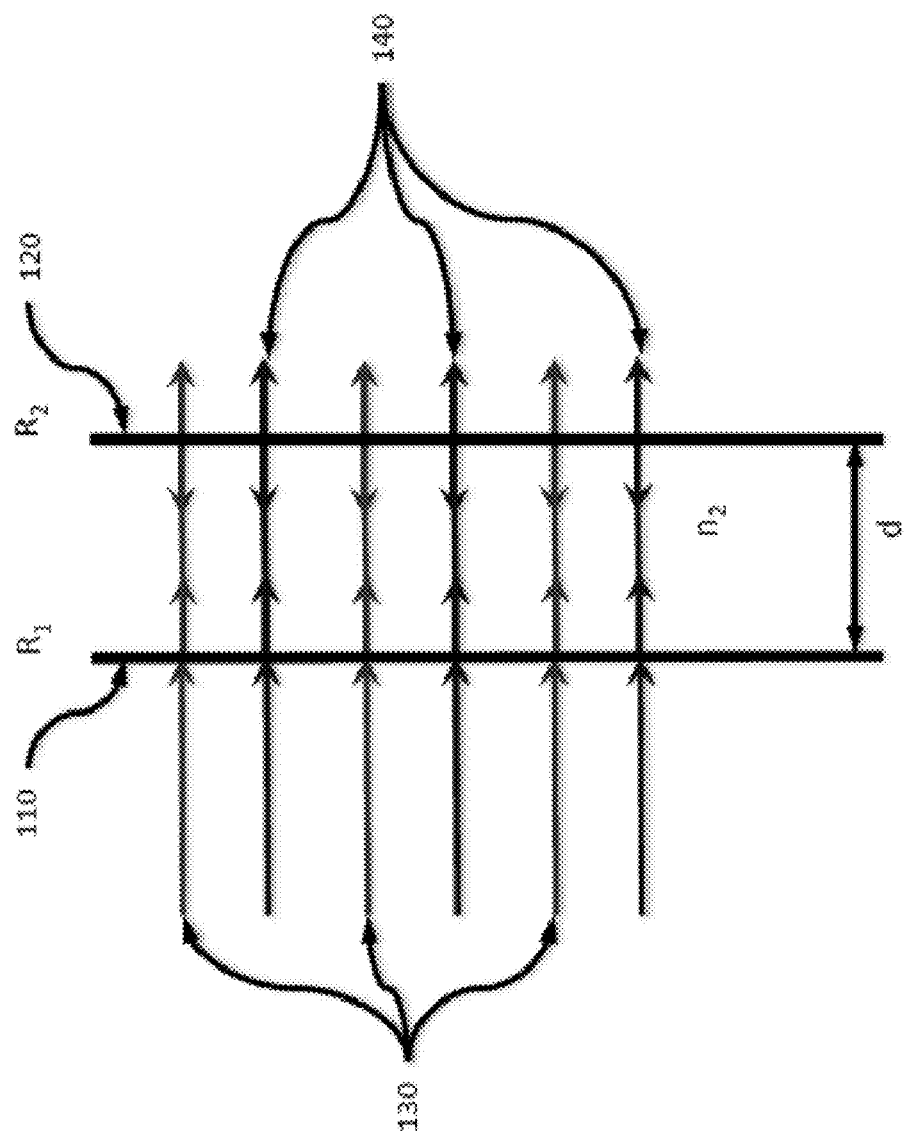

FIG. 6 is an illustrative diagram of an FPI embodiment according to an example implementation of the disclosed technology.

Figure 7:
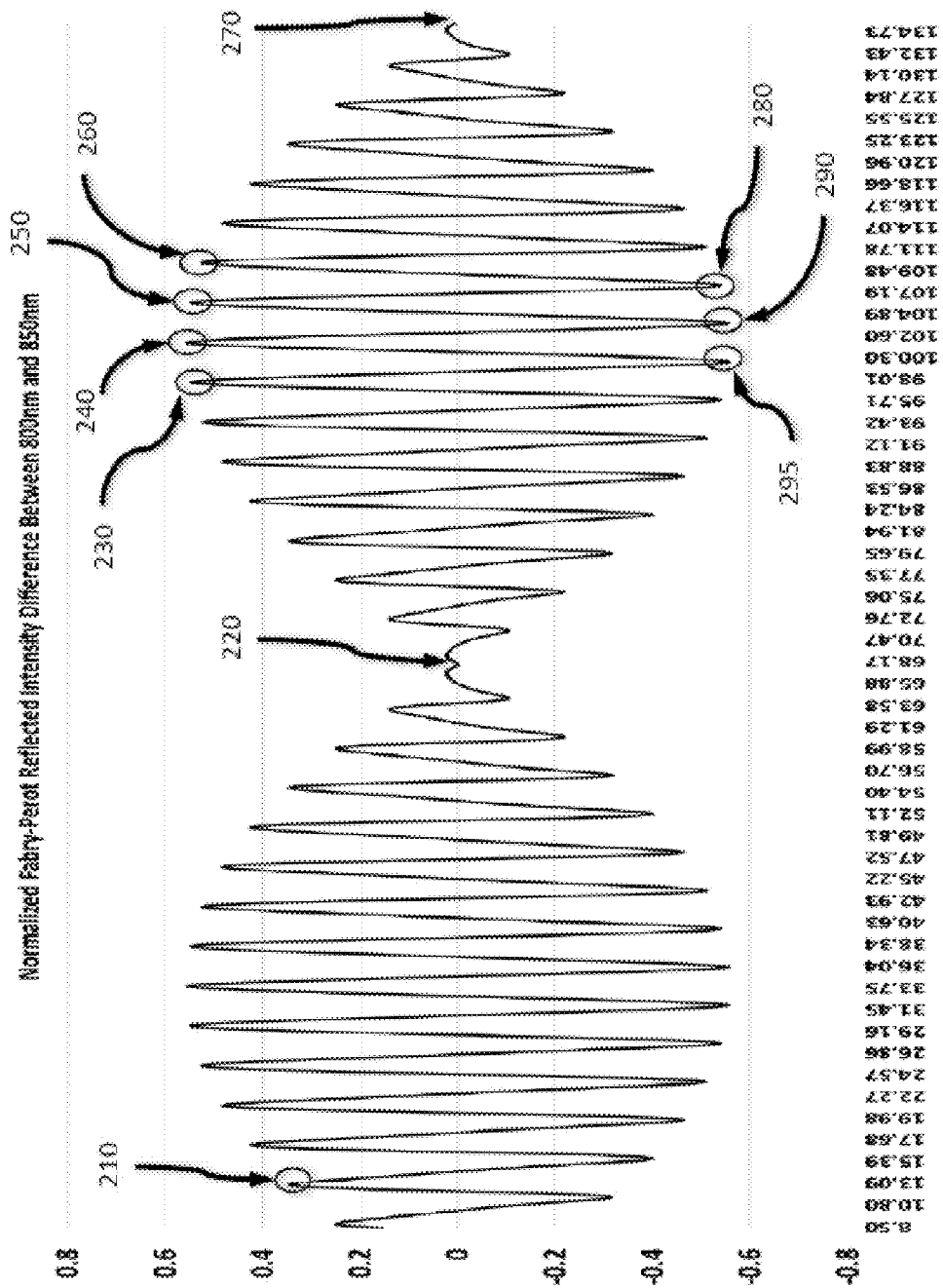

FIG. 7 is chart that depicts differences between normalized reflection intensities for two example interrogation light wavelengths (800 nm and 850 nm) as a function of cavity length for an example FPI, according to an example implementation of the disclosed technology.

Figure 8:
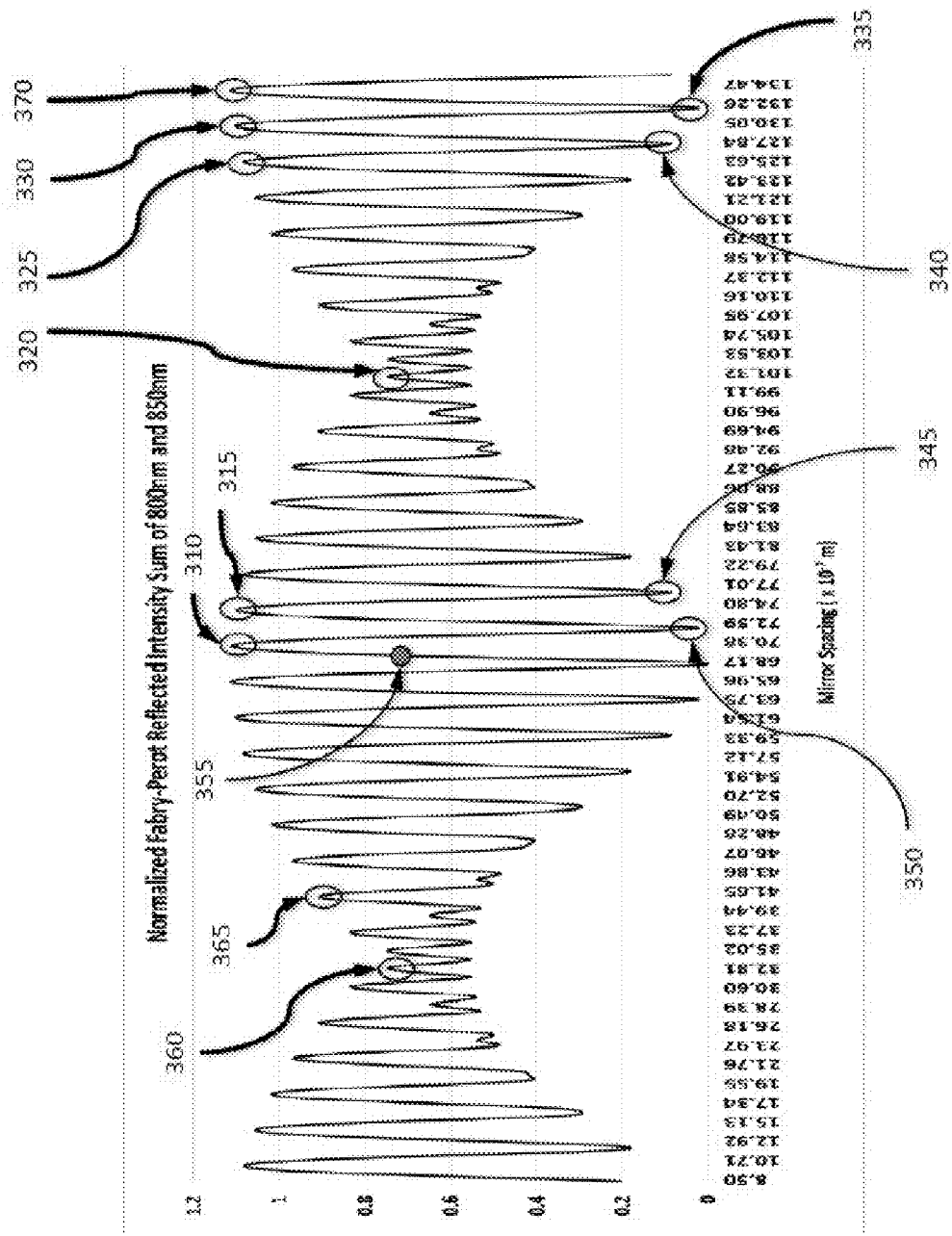

FIG. 8 is chart depicting the sum of normalized reflection intensities for two example interrogation light wavelengths (800 nm and 850 nm) as a function of cavity length for an example FPI, according to an example implementation of the disclosed technology.

Figure 9:
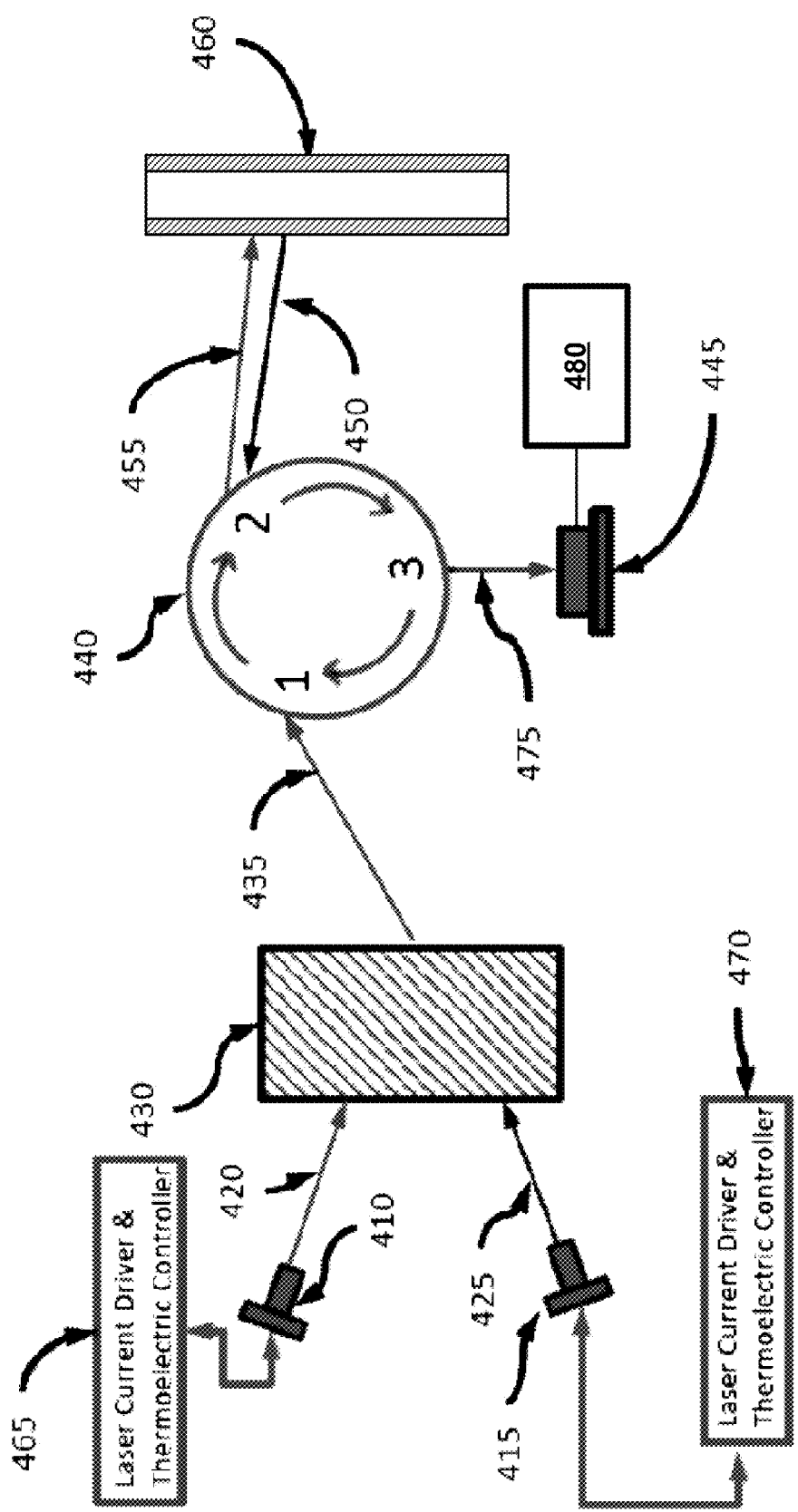

FIG. 9 is a block diagram of an example optical pressure switch/transducer system, in accordance with an example implementation of the disclosed technology.

Figure 10:
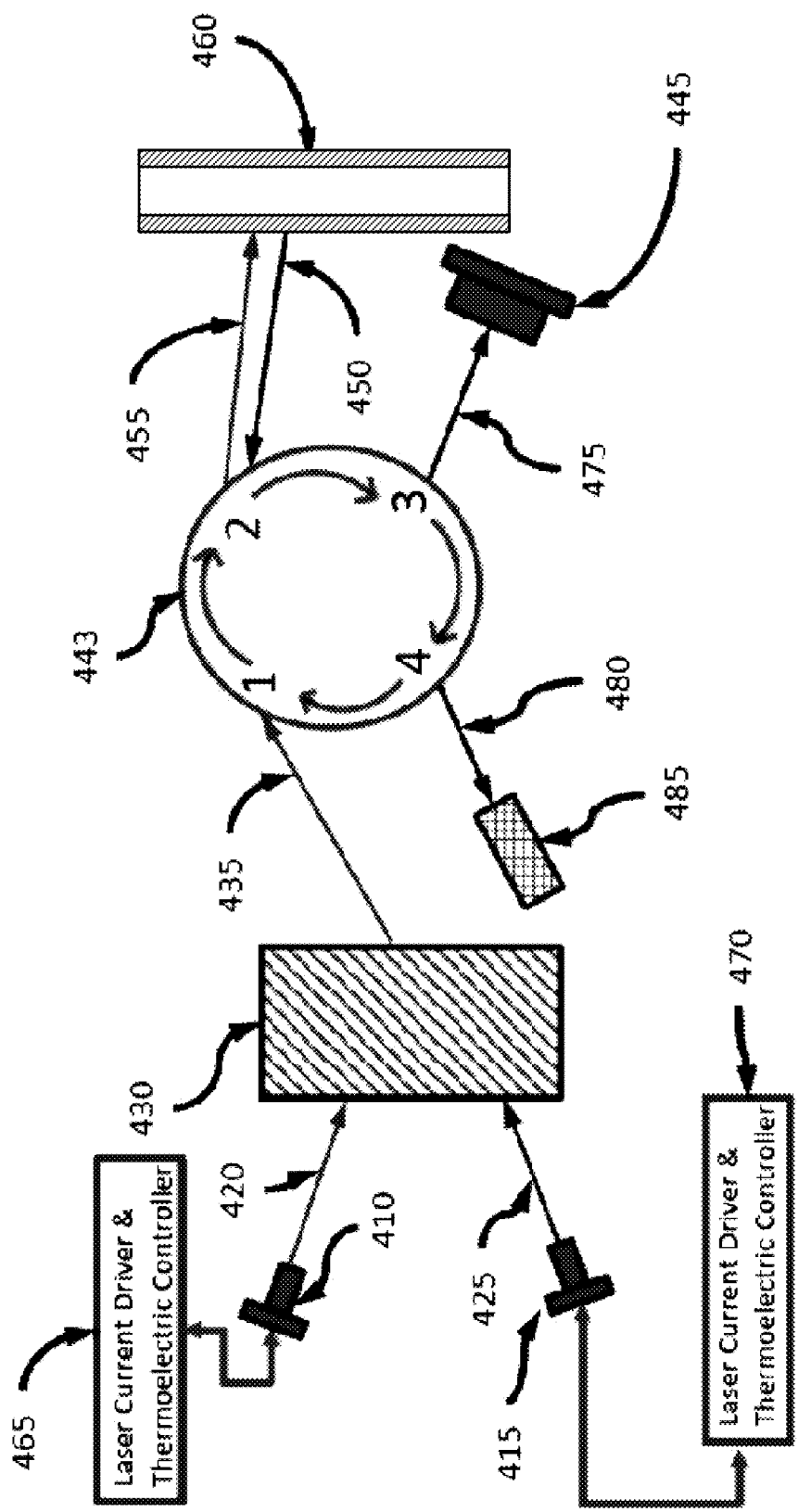

FIG. 10 is a block diagram of an example optical pressure switch/transducer system that may be utilized to reduce reflections, in accordance with an example implementation of the disclosed technology.

Figure 11:
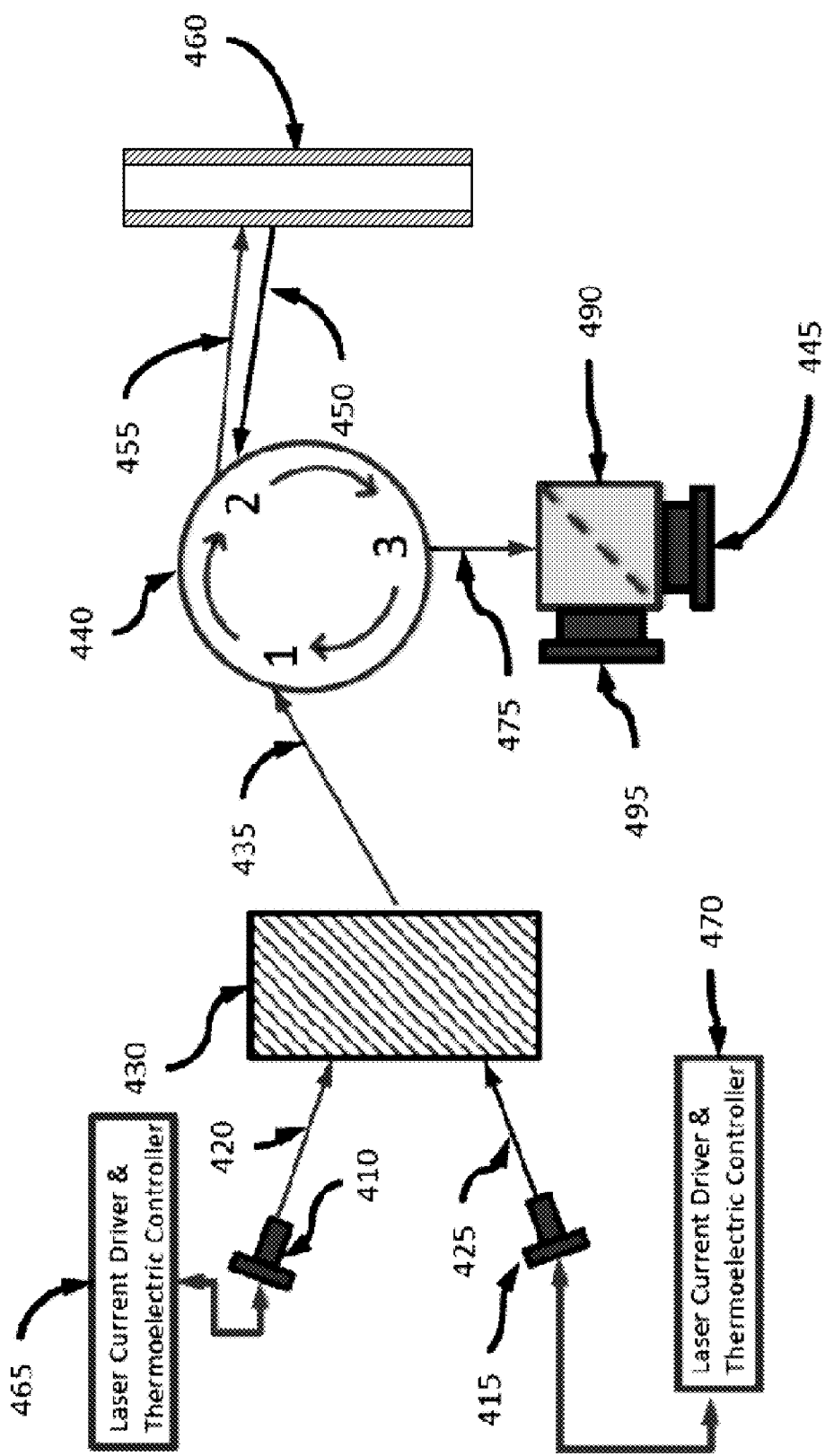

FIG. 11 is a block diagram of another example optical pressure switch/transducer system using a beamsplitter to separate wavelengths, in accordance with an example implementation of the disclosed technology.

Figure 12:
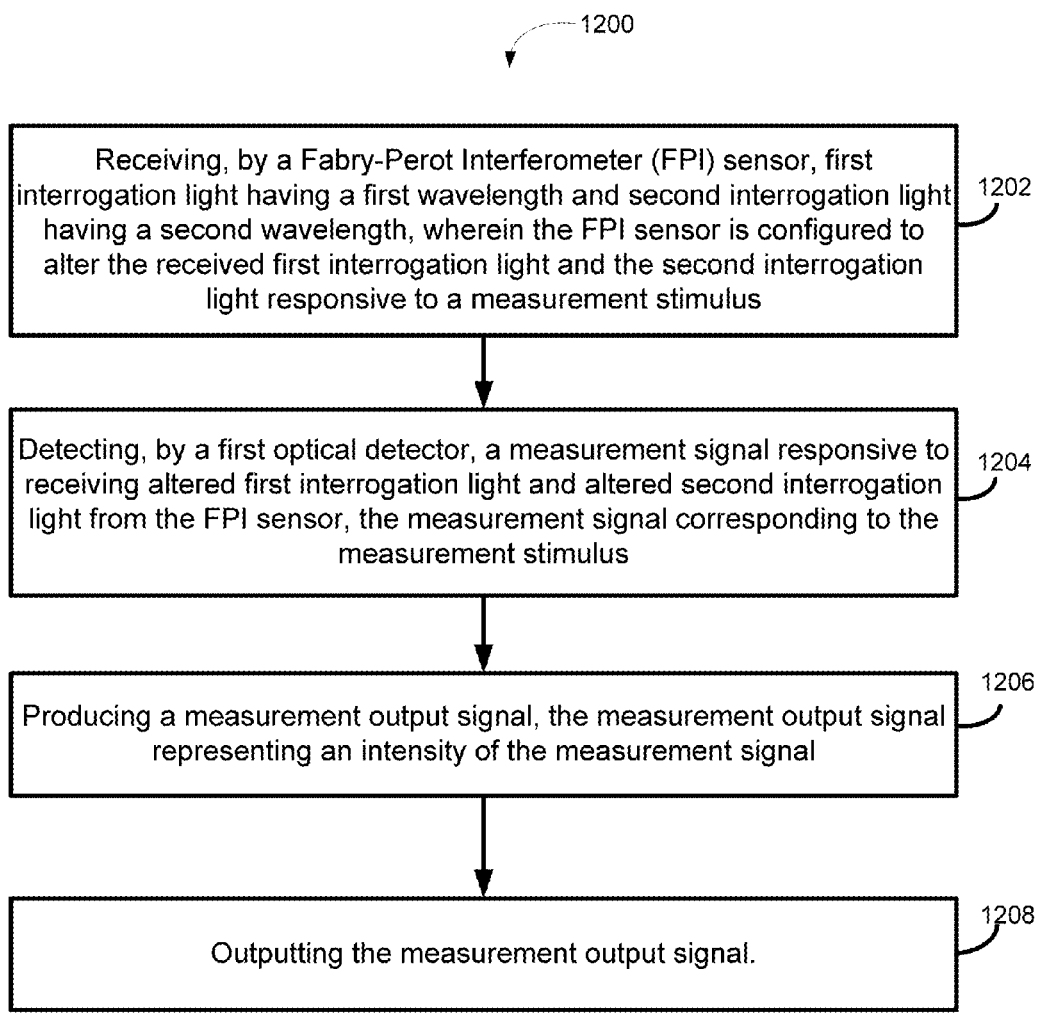

FIG. 12 is a flow diagram of a method, in accordance with an example implementation of the disclosed technology.

Figure 13:
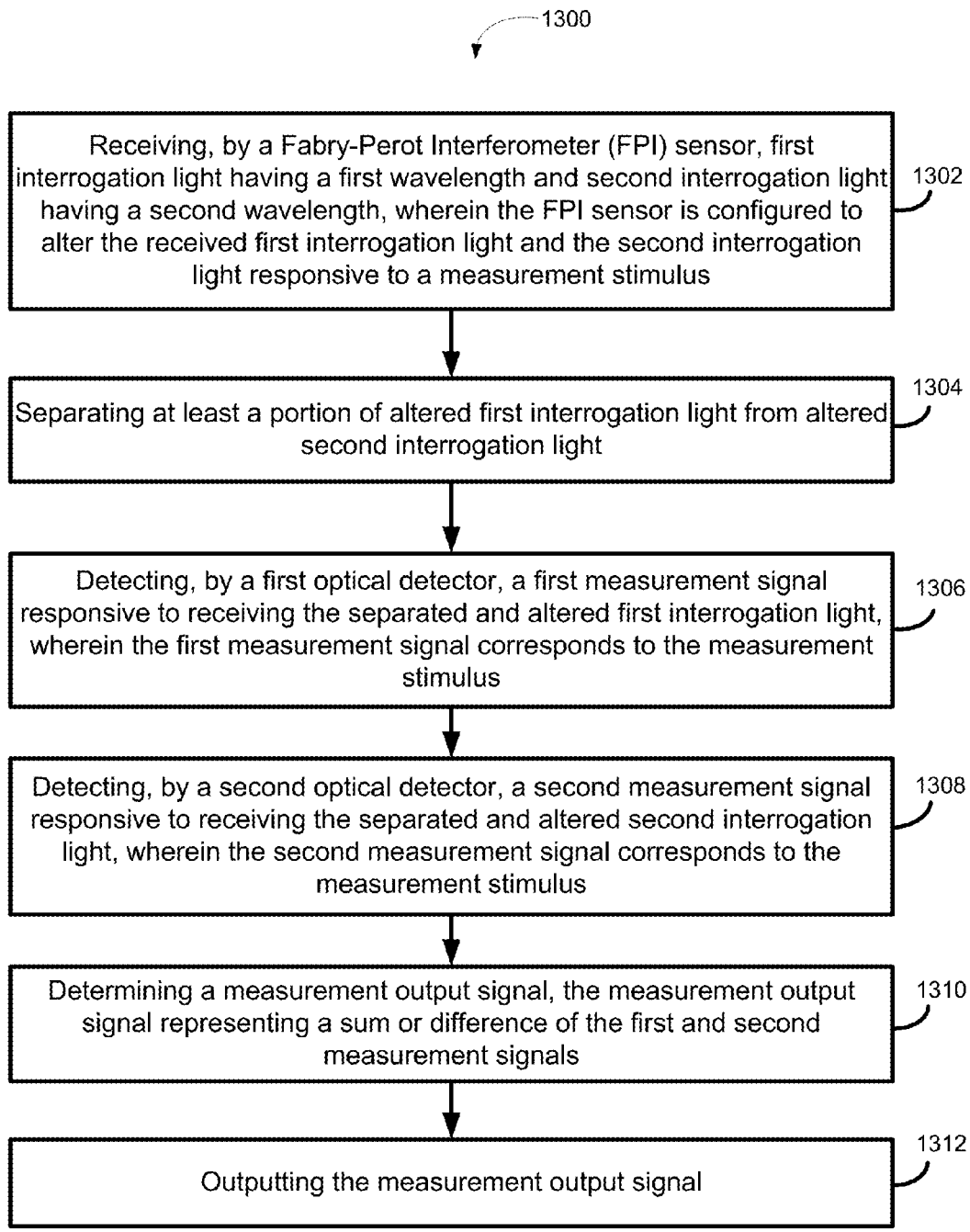

FIG. 13 is a flow diagram of a method, in accordance with an example implementation of the disclosed technology.

DETAILED DESCRIPTION

The disclosed technology includes optical measurement systems and methods that utilize an optical Fabry-Perot Interferometer (FPI)-based sensor for measuring stimuli such as temperature, pressure, acceleration, etc. The signals generated by the FPI sensor may be in the form of a variation in optical interference intensity as the sensors are subjected to the stimuli.

Various example implementations of the disclosed technology utilize an optical FPI having two partially reflective surfaces that form an optical cavity of the FPI. Interrogation light introduced into the cavity undergoes multiple reflections within the cavity. The resulting multiple waves within the cavity can constructively or destructively interfere to produce a reflectance and/or transmittance signal having respective phase and intensity as a function of factors such as the interrogation wavelength, the optical cavity length, the reflectivity of the cavity surfaces, the index of refraction of the various components, etc. As the length of the optical cavity changes, the interference signal exiting the FPI changes accordingly. The change in the optical cavity length can result from changes in pressure, temperature, vibration, or acceleration.

In certain example implementations, it may be desirable for the intensity of the light exiting the FPI to change linearly with the quantity being sensed. A typical value of reflectivity for the cavity surfaces of the FPI can be around 4% to provide such linearity.

Figure 1:
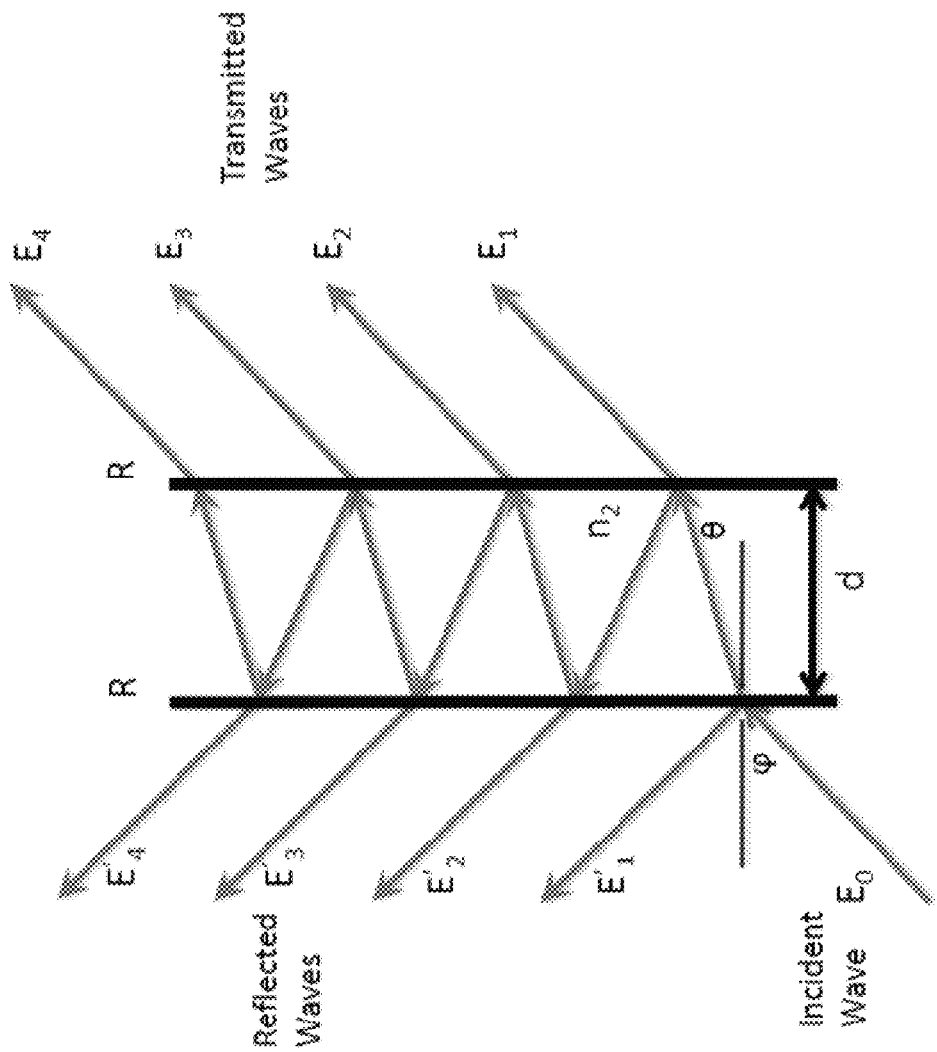
FIG. 1 depicts a Fabry-Perot Interferometer (FPI) having an input light ray incident at an angle with respect to the normal of the reflective surfaces of the FPI to illustrate multiple reflections.

FIG. 1 depicts a Fabry-Perot Interferometer (FPI) having an input light ray $E_0$ incident at an angle $\varphi$ with respect to the normal of the reflective surfaces (R) of the FPI to illustrate multiple reflections. The most general case occurs when the incident light ray is assumed to enter the FPI from outside at an external angle $\varphi$ with respect to the normal of the reflective surface. The internal angle $\theta$ may be calculated by applying Snell's law. Generally, the incident wave $E_0$ enters the cavity via the first reflective surface and it reflects back and forth a large number of times for highly reflective surfaces. The intensity of the reflected and transmitted waves may be a function of factors such as the cavity gap distance d, the incident angle $\varphi$, the wavelength of the input light ray $E_0$, the refractive index $n_2$ of the cavity, etc., as known by those having skill in the art.

Figure 2:
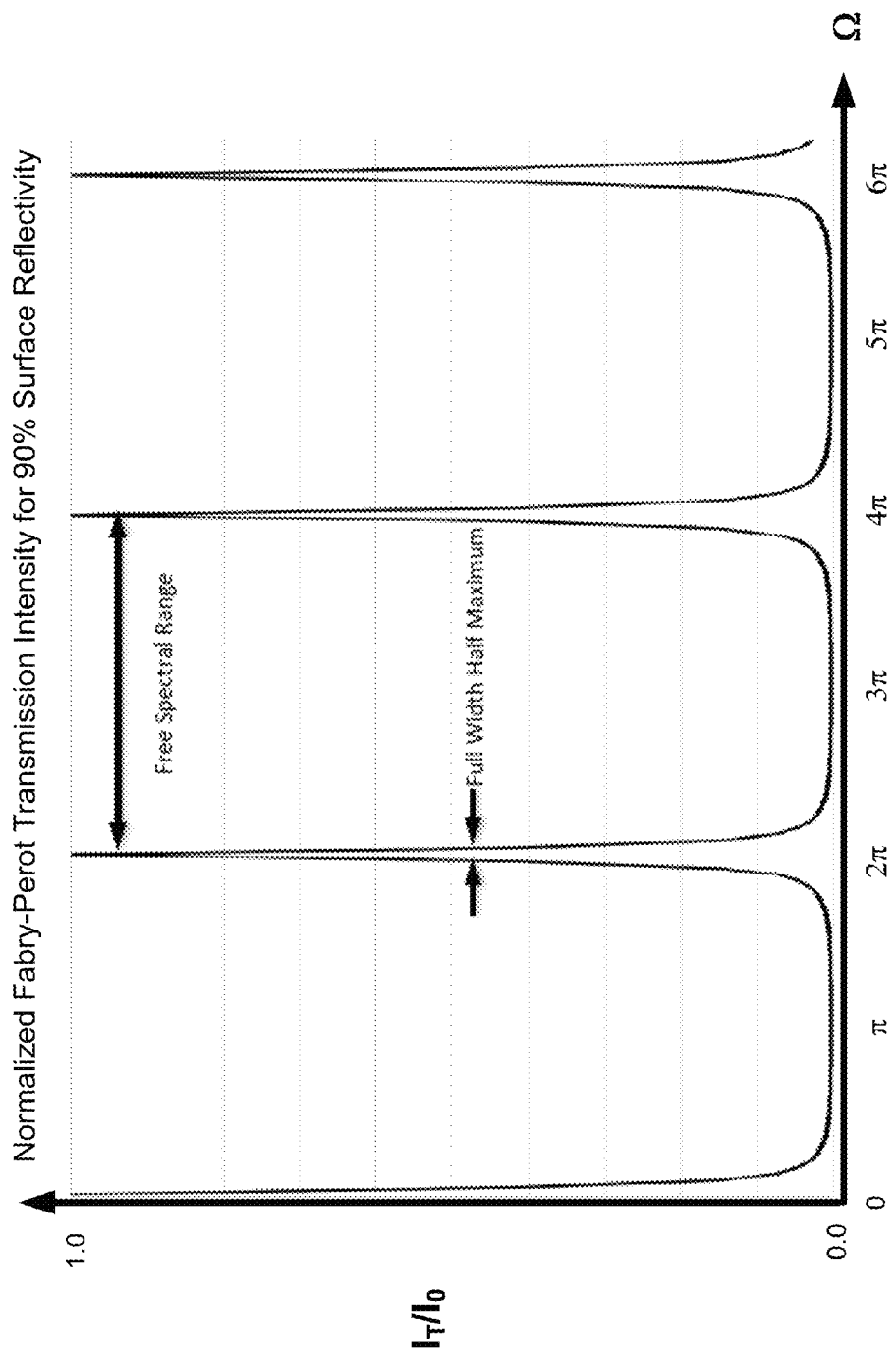
FIG. 2 is a graph of normalized transmission intensity for an example FPI as a function of phase differences 1 between the transmitted waves ($E_1$, $E_2$, etc., see FIG. 1), in accordance with an example implementation of the disclosed technology.

FIG. 2 depicts a normalized transmission intensity for an example FPI as a function of phase differences $\Omega$ between the transmitted waves ($E_1$, $E_2$, etc., see FIG. 1), in accordance with an example implementation of the disclosed technology. This normalized transmission intensity may be expressed by the Airy function:

$$\frac{I_T}{I_o} = \frac{1}{1 + \frac{4R}{(1-R)^2}\sin^2\left(\frac{\Omega}{2}\right)} \quad (1)$$

where R is the reflectivity of the surfaces, $\Omega$ phase differences between the transmitted waves (E1, E2, etc), $I_T$ is the transmitted intensity and $I_0$ is the incident intensity of the interrogation light.

The Coefficient of Finesse, F, which is a measure of the sharpness of the interference pattern, may be expressed as:

$$F = \frac{4R}{(1-R)^2} \quad (2)$$

The finesse, F (which is different from the Coefficient of Finesse, F), may be expressed as:

$$\mathcal{F} \sim \frac{\pi\sqrt{F}}{2} = \frac{2\pi}{FWHM} = \frac{v_{fsr}}{v_c} \quad (3)$$

where $v_{fsr}$ is the free spectral range, i.e., the frequency separation between adjacent transmission maxima (often represented as $\Delta\lambda$ for wavelength units) and $v_c$ is the full width half max of any one of the transmission peaks (often represented as $\Delta\delta$ for wavelength units). The finesse relates the sharpness of the interference pattern to the spacing between the transmission maxima (or reflection minima). In certain embodiments, a large spacing between the maxima may not be desirable as an output signal (responsive to input stimuli) for such a FPI sensor may fall in a "dead zone" where no appreciable signal is generated between the maxima.

Figure 3:
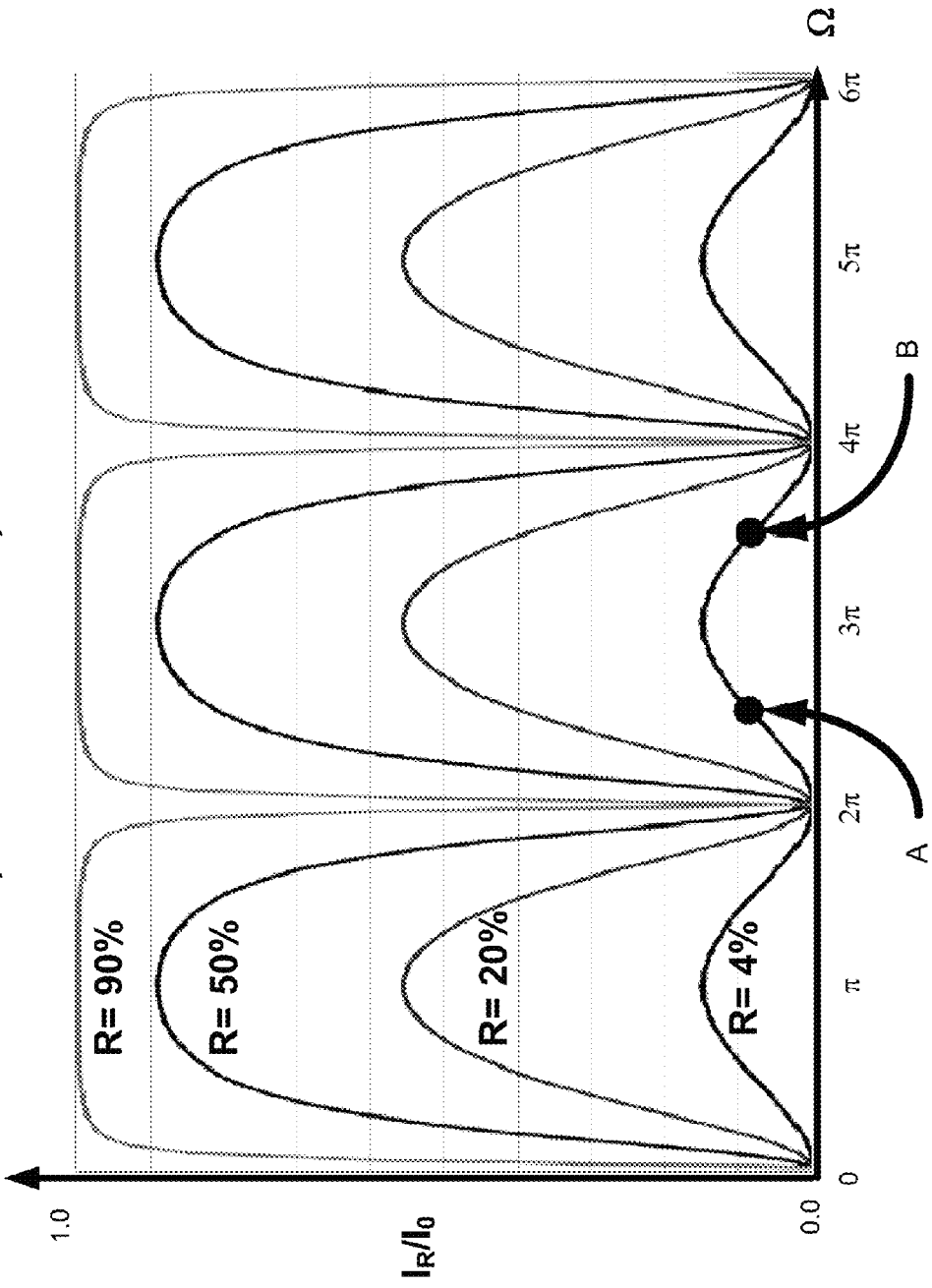
FIG. 3 is a combined graph of normalized FPI reflection intensities for various surface reflectivities (R=4%, 20%, 50%, and 90%) as a function of phase differences $\Omega$ between the reflected waves ($E_1'$, $E_2'$, etc., see FIG. 1), with curve quadrature points (A, B) indicated, in accordance with an example implementation of the disclosed technology.

FIG. 3 is a combined graph of normalized FPI reflection intensities for various surface reflectivities (R=4%, 20%, 50%, and 90%) as a function of phase differences $\Omega$ between the reflected waves ($E_1'$, $E_2'$, etc., see FIG. 1), with curve quadrature points (A, B) indicated, in accordance with an example implementation of the disclosed technology. As depicted in FIG. 3, as the reflectivity R of the FPI cavity mirrors is reduced, the shape of the Airy function becomes closer to a cosine function. By configuring the reflectivity at 4.54%, the reflection intensity $I_R$ can be approximated by two-wave interference, and may be represented by:

$$I_R = 2I_o\left(1 + \cos\left(\frac{4\pi n_2 d}{\lambda}\right)\right) \quad (4)$$

where $n_2$ is the refractive index in the FPI cavity, d is the separation distance between the two reflective surfaces of the FPI, $\lambda$ is the interrogation wavelength and $I_0$ is the interrogation light irradiance intensity. The approximation given in equation (4) results in a cosine wave with a finesse coefficient of 0.20 and a finesse of 0.70.

According to an example implementation of the disclosed technology, and for a linear relationship between the output light signal and the input (pressure) stimulus, it may be advantageous to bias the cavity length d (or the interrogation wavelength $\lambda$) such that the FPI operates at the quadrature point (for example, point A) as indicated in FIG. 3. When using the FPI as a pressure sensor, the FPI cavity length d changes as a function of applied pressure and the reflected light $I_R$ output can approach the maximum or minimum portion of the curve, placing the sensor in a dead zone with little or no output signal even if the sensor input is changing. This limits the total motion of the reflective surfaces of the Fabry-Perot sensor to about ⅛ of the wavelength of the light being used in the sensor.

The aforementioned 4.54% reflectivity (for producing equation (4) above) may be achieved by the natural reflection from glass-air interfaces. The reflectivity at an interface is given by:

$$R = \frac{[n_1 - n_2]^2}{[n_1 + n_2]^2} \quad (5)$$

Figure 4:
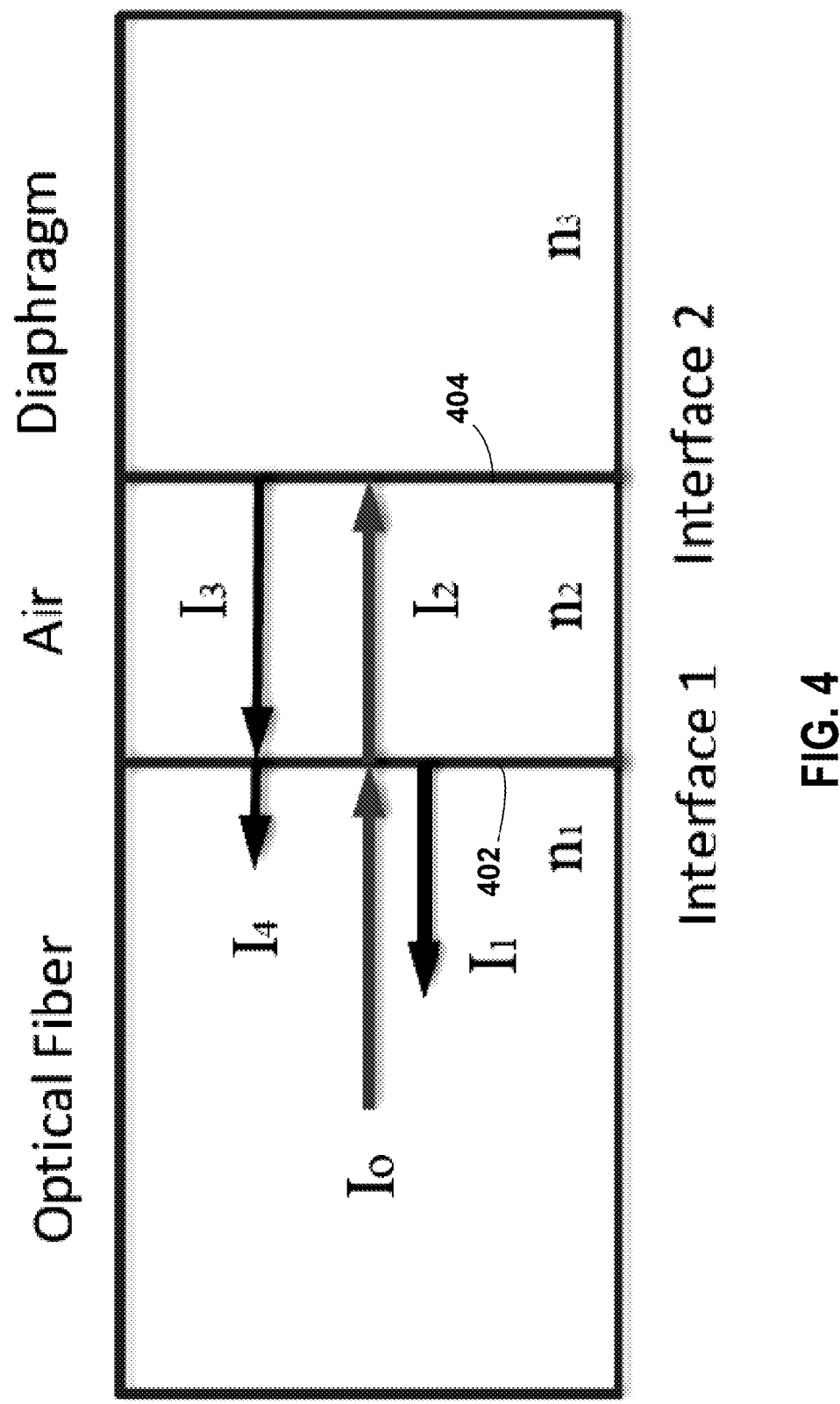
FIG. 4 depicts an example FPI having an input light ray Io incident normal to the reflective surfaces of the FPI, in accordance with an example implementation of the disclosed technology.

As shown in FIG. 4, if the index of refraction $n_1$ of the input medium (optical fiber) is approximately 1.542 and if the FPI cavity comprises air, having an index of refraction $n_2$ of approximately 1.0, the resulting reflectivity R (from equation (5) above) at the first interface 402 (between the optical fiber and the cavity is approximately 4.54%. In an example implementation, the surface of the optical fiber and the surface of the diaphragm may be uncoated. In an example implementation, the diaphragm may be glass, resulting in the same reflectivity of 4.54% at the second air-diaphragm interface 404.

In accordance with certain example implementations, systems and methods are disclosed herein that utilize two independent interrogation light sources having different wavelengths. Certain example implementations may deviate from the very low reflective surfaces of the FPI (and the corresponding low finesse for the FPI cavity) as described above. In the following example implementations, reflective surfaces may be configured with relatively high reflectivity to form the interferometric cavity of an FPI sensor. In accordance with an example implementation of the disclosed technology, two different interrogation wavelengths may be utilized to disambiguate the output from the FPI sensor without having to avoid the dead zone regions, as previously discussed.

Throughout the figures and examples included in this description, certain implementations are described that utilize the example light wavelengths of 800 nm and 850 nm. However, various other embodiments of the disclosed technology may utilize different wavelengths, with other system factors such as cavity lengths, reflectivity, emission spectrum, etc. adjusted accordingly. For example, certain implementations may take advantage of relatively cheap laser diode modules, such as those used compact disc (CD) players and CD burners with output wavelengths, for example, of 650 nm and 780 nm. As may be apparent to one having ordinary skill in the art, other choices for interrogation light wavelengths may be utilized, but for simplicity and consistency, the light interrogation example wavelengths of 800 nm and 850 nm are utilized for illustration purposes in the following examples.

Figure 5:
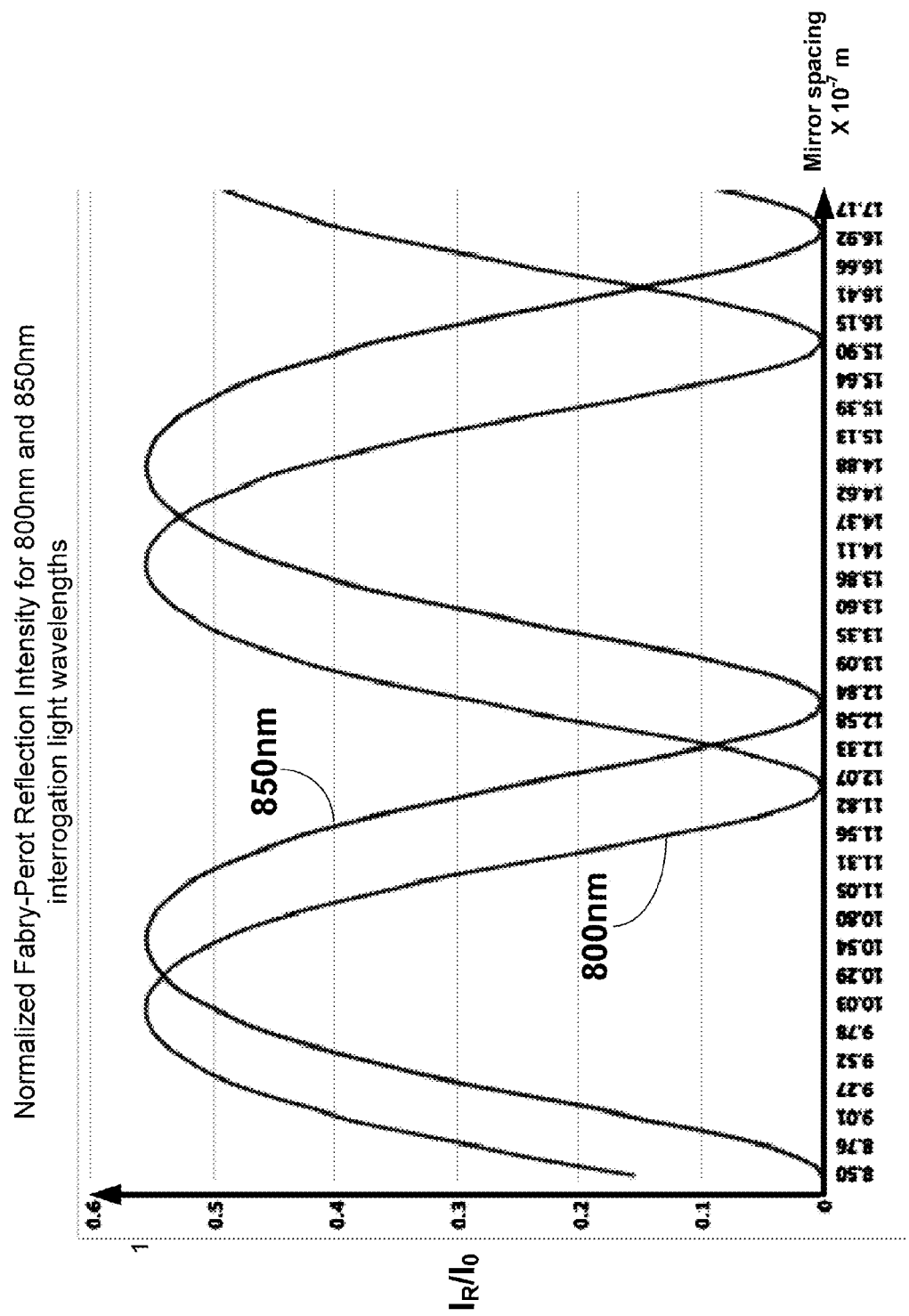
FIG. 5 depicts example FPI normalized reflection intensities for two example interrogation light wavelengths (800 nm and 850 nm) as a function of the FPI cavity length (mirror spacing) according to an example implementation of the disclosed technology.

FIG. 5 depicts example normalized reflection intensities (interference patterns) for two example interrogation light wavelengths (800 nm and 850 nm) as a function of the FPI cavity length, according to an example implementation of the disclosed technology.

In an example implementation, subtraction or addition of the two independent interference patterns may be utilized to create a single interference pattern having regularly spaced fringes and varying intensities per fringe. Such a signal may form as function of the wavelengths of the two interrogation light sources and the reflectivity of the interferometric surfaces that make up the FPI sensor.

FIG. 6 is an illustrative diagram of an FPI embodiment according to an example implementation of the disclosed technology, where $n_2$ is the index of refraction of the material between the reflective surfaces and d is the spacing (or cavity length) between the reflective surfaces. It can be shown by using the Airy function for reflectivity that a well-formed signal can result by taking a sum or difference of the interference fringe patterns that result from the two interrogation light sources having different wavelengths. In accordance with an example implementation, a FPI sensor is disclosed having a reflectivity of about 20% at the first interface surface 110 and at the second interface surface 120 (resulting in a calculated finesse of 1.76). By interrogating this example FPI sensor with light having a first wavelength 130 (for example 800 nm) and light having a second wavelength 140 (for example 850 nm), the resulting difference and sum curves (shown respectively in FIG. 7 and FIG. 8) may be produced.

Although the aforementioned value of finesse (1.76) may not be considered high for a laser cavity, it is about 2.5 times greater than that used for typical Fabry-Perot Interferometer-based sensor designs. The 20% reflectance of the diaphragm and exiting surface of the optical fiber may achieved, according to an example implementation, by using optical thin film techniques to produce thin film coatings to create reflective surfaces having approximately 20% reflectivity for wavelengths of 800 nm and 850 nm. Various materials can be utilized to create the thin film reflective coatings. For example, oxides such as $SiO_2$ and/or $TiO_2$ may be used to create reflective coatings. Certain example implementations may utilize materials such as $TiO_2/Ag/TiO_2$, $ZrO_2$, etc. for the thin film reflective coatings. In certain example implementations, multilayer coatings may be utilized to achieve a desired reflectance.

As described herein, this unique combination of laser wavelengths and reflectively may enable the production of interference curves that enable disambiguation of a signal corresponding to a pressure measurement through summation or subtraction. The disclosed interrogation wavelengths and surface reflectivities disclosed herein are examples that may take advantage of relatively inexpensive laser light sources. However, the disclosure is not limited to such wavelengths, reflectivities, and/or materials as described in the illustrative examples.

Referring again to FIG. 7, the interference pattern resulting from the subtraction of the two independently created reflection interference patterns from the two interrogation light wavelengths may be expressed as:

$$I_R^-(d) = \frac{I_0' 4R \sin^2\left(\frac{2\pi n_2 d}{\lambda'}\right)}{(1-R)^2 + 4R\sin^2\left(\frac{2\pi n_2 d}{\lambda'}\right)} - \frac{I_0 4R \sin^2\left(\frac{2\pi n_2 d}{\lambda}\right)}{(1-R)^2 + 4R\sin^2\left(\frac{2\pi n_2 d}{\lambda}\right)} \quad (6)$$

where R is the reflectivity of the interferometric surfaces in the FPI sensor, which are assumed to have the same reflectivity, d is the spacing between the reflective surfaces, and $n_2$ is the index of refraction of the material between the reflective surfaces. $\lambda'$ and $\lambda$ are the laser wavelengths 850 nm and 800 nm respectively. For lasers emitting equivalent intensity so that $I_0 = I_0'$, the normalized intensity of the subtracted interference patterns is given by:

$$\frac{I_R^-(d)}{I_0} = \frac{4R \sin^2\left(\frac{2\pi n_2 d}{\lambda'}\right)}{(1-R)^2 + 4R\sin^2\left(\frac{2\pi n_2 d}{\lambda'}\right)} - \frac{4R \sin^2\left(\frac{2\pi n_2 d}{\lambda}\right)}{(1-R)^2 + 4R\sin^2\left(\frac{2\pi n_2 d}{\lambda}\right)} \quad (7)$$

Equation (7) is depicted graphically in FIG. 7 as a function of the cavity length d.

According to an example implementation of the disclosed technology, the two interference patters (resulting from the interrogation of the FPI sensor with two different wavelengths) may be added, with the result expressed as:

$$I_R^+(d) = \frac{I_0' 4R \sin^2\left(\frac{2\pi n_2 d}{\lambda'}\right)}{(1-R)^2 + 4R\sin^2\left(\frac{2\pi n_2 d}{\lambda'}\right)} + \frac{I_0 4R \sin^2\left(\frac{2\pi n_2 d}{\lambda}\right)}{(1-R)^2 + 4R\sin^2\left(\frac{2\pi n_2 d}{\lambda}\right)} \quad (8)$$

For lasers emitting equivalent intensity so that $I_0 = I_0'$, the normalized intensity is given by:

$$\frac{I_R^+(d)}{I_0} = \frac{4R \sin^2\left(\frac{2\pi n_2 d}{\lambda'}\right)}{(1-R)^2 + 4R\sin^2\left(\frac{2\pi n_2 d}{\lambda'}\right)} + \frac{4R \sin^2\left(\frac{2\pi n_2 d}{\lambda}\right)}{(1-R)^2 + 4R\sin^2\left(\frac{2\pi n_2 d}{\lambda}\right)} \quad (9)$$

Equation (9) is depicted graphically in FIG. 8 as a function of the cavity length d.

In accordance with an example implementation of the disclosed technology, changes in pressure acting on the FPI sensor may deflect a diaphragm coupled to one of the reflective surfaces. In an example implementation, as the diaphragm deflects, the intensity of the reflected light signal may modulate from a maximum to a minimum intensity value and may be measured by a detector.

In accordance with an example implementation of the disclosed technology, maximum and/or minimum intensity extremes (as shown in FIG. 7 or FIG. 8) may be counted to determine a pressure variation. In certain example implementations, the total deflection of the diaphragm (as a function of measurable pressure range) may be utilized to determine a pressure resolution of a FPI sensor, for example, when the FPI sensor is operated in a mode to count the maximum and minimum intensity extremes. The change in the distance between the reflective surfaces in the Fabry-Perot that results in traversing one fringe envelope may be expressed as:

$$\Delta L = \frac{\lambda \cdot \lambda'}{2(\lambda - \lambda')} \quad (10)$$

For laser wavelengths of 800 nm and 850 nm, this gap (cavity length) distance change is equal to 6.8 microns. Such a gap change $\Delta L$ corresponds to the length differences between point 220 and point 270 in FIG. 7.

The change in the distance between the reflective surfaces in the Fabry-Perot that results in traversing from a maximum intensity point to the neighboring maximum intensity point may be expressed as:

$$\Delta L' = \frac{\lambda \cdot \lambda'}{(\lambda + \lambda')} \quad (11)$$

For laser wavelengths of 800 nm and 850 nm, this gap distance change is equal to 0.41 microns. Such a gap change $\Delta L'$ corresponds to length differences between point 230 and point 240 in FIG. 7. $\Delta L'$ is shown in FIG. 8 as the distance between point 310 and point 315. $\Delta L$ is shown in FIG. 8 as the distance between point 360 and 320.

In accordance with an example implementation of the disclosed technology, the optical fringe sum output signal, as depicted FIG. 8, may be measured with a single detector. In certain example implementations, the resulting electronic signal may be utilized to detect and/or trigger on the maximum and minimum points. In certain example implementations, the signals may be digitized.

As shown in FIG. 8, the displacement between a maximum point 315 and a minimum point 345 may be correlated to the pressure applied to cause such cavity length displacement. In an example implementation, the displacement y of a FPI sensor diaphragm may be related to the diaphragm thickness h and the applied pressure by the following:

$$h = \left[\frac{Pa^4}{Ey} \frac{3}{16}(1-v^2)\left(1 - \left(\frac{b}{a}\right)^4 - 4\left(\frac{b}{a}\right)^2 \ln\left(\frac{a}{b}\right)\right)\right]^{1/3} \quad (12)$$

where P is the applied pressure, v is Poisson's Ratio, E is the Modulus of Elasticity, y is the displacement of the diaphragm, a is measured from the beginning of the flexible part of the diaphragm to the middle of the rigid center and b is the radius of the rigid center of the diaphragm. In certain example implementations, the resolution of the pressure measurement of the pressure switch may be defined by the equation (12). For example, if the pressure switch is to be activated at 50 psi with a resolution of 1 psi, a total of 25 intensity maximums and 25 intensity minimums must be traversed over the pressure range 0-50 psi. Since the spacing between a maximum and a minimum is 0.20 microns, the total deflection range is 50 psi times 0.20 microns/psi which equals 10 microns. Inserting 10 microns for the deflection y, 50 psi for the applied pressure and the appropriate values for a, b, E and v, for glass materials such as Zerodur™, ULE™ and other glasses known to those having skill in the art, into equation (12) yields the required diaphragm thickness for the pressure switch.

The calculated value for h can be used to calculate the bending stress in the glass.

The bending stress in the glass diaphragm is given by:

$$\sigma_{max} = \frac{3P(a^2 - b^2)}{4h^2} \tag{13}$$

For diaphragms with an outer diameter of 0.25 inches, a maximum operating pressure of 1000 psi is attainable. In an example implementation, an optical pressure switch may be configured to withstand the applied pressure range and diaphragm stresses. Certain example implementations, may provide desired pressure. In certain example implementations, the optical output signal may be digitized, for example, by counting the intensity maximums and minimums.

Utilizing the example presented above, with reference to FIG. 8, the intensity maximums and minimums may be counted to provide a "quantized" pressure measurement. For example, traversing from a maximum point 310 to a minimum point 350 may represent a 1 psi change in pressure. Additional 1 psi increments may occur for signals that traverse, for example, from a maximum point 315 to a minimum point 345, etc. Since the peak value of the intensity maximums and minimums change as a function of the cavity length, certain example implementations of the disclosed technology may be utilized to keep track of which maximum or minimum is being read on the curve.

To further illustrate the example, and according to an implementation of the disclosed technology, the intensity of maximum or minimum points (for example, point 350) may be compared with subsequent minimum or minimum points (for example, point 345) to determine if the diaphragm is undergoing increasing or decreasing deflection. In certain example implementations, such information may be utilized to determine and disambiguate the FPI sensor's current pressure-induced cavity deflection point. Certain example implementations may utilize this information to determine the deflection position with respect to the fringe curve envelope, for example, as show in FIG. 8.

Returning again to the example described above with reference to FIG. 8, an example pressure switch is disclosed herein that may be activated at a given pressure, and may be configured to have a given resolution. For example, a FPI pressure switch may be activated at 50 psi with a resolution of 1 psi. In this example implementation, a total of 25 intensity maximums and 25 intensity minimums may be traversed over the pressure range 0-50 psi. In this example implementation, if the cavity length deflection difference between a maximum and a minimum is 0.20 microns, the total deflection range is 50 psi times 0.20 microns/psi which equals 10 microns. Since the deflection from point 360 to point 320 in FIG. 8 is 6.8 microns, the total deflection range would be covered from approximately point 365 to point 370. For example, point 365 may represent 0 psi, and point 370 may represent 50 psi where the pressure switch may be activated.

According to an example implementation of the disclosed technology, the pressure may be measured by counting the intensity maximums and minimums and using the variation in the values of the maximums and minimums as check with regard to deflection direction and position on the larger curve. According to an example implementation of the disclosed technology, once the FPI-based pressure switch is triggered at point 370, hysteresis may be used to keep the switch from entering an oscillating condition and to keep it from continuously turning on and off. For example, the switch can be set to trigger at 370 and not turn off until it returns back past point 335, and/or point 330, and/or point 340 and shuts off at point 325. In accordance with this example implementation, the pressure switch may trigger at 50 psi and may not turn off until the pressure lowers to 47 psi or to any desired pressure point to turn off.

The examples provided above with respect to FIG. 8 may also apply to the difference fringe pattern shown in FIG. 7, which may be produced by subtracting the fringe patterns as shown in FIG. 5 and represented by equation (7). Using the previous example as described with reference to FIG. 8, but using the difference fringe pattern as shown in FIG. 7, the 10-micron deflection may be traversed from point 210 to approximately point 260 (FIG. 7) for a 50 psi pressure range. In this example implementation, an example FPI-based pressure switch may be set to trigger at point 260 (corresponding to 50 psi) and use intensity maximum point 250, point 240, point 230 and intensity minimum point 280, point 290 and point 295 to act as hysteresis points and ultimately the turn off point. It should be appreciated that the additive or summed fringe approach, as shown and described with reference to FIG. 8, has the advantage of continuous fringes at point 360 and point 320 as compare to point 220 and point 270, as shown in FIG. 7.

For a pressure switch, and according to an example implementation, the "discontinuous" regions near point 220 and point 270, as shown in FIG. 7 may be calibrated out; however, for a pressure transducer, the additive approach with continuous fringe regions may be desirable. The additive (or summation) approach also has the advantage that the two light waves (for example, 800 nm and 850 nm) may exit the FPI sensor collinearly and enter the photodetector together to produce an optically additive signal which can be directly measured by a single detector, thus simplifying the associated electronics. On the other hand, the subtractive approach may require separating the two beams optically and directing the beams to separate photodetectors and subtracting the signals electronically.

In accordance with an example implementation of the disclosed technology, a pressure transducer may utilize the additive approach as described above with reference to the pressure switch and FIG. 8. However, in this example implementation, the intensity of the fringe pattern may be monitored continuously by a photodetector instead of quantizing by counting the maximum and minimum points, as previously described with respect to the pressure switch.

Since the values of the intensity maximums and minimums change as a function of deflection of the diaphragm (and hence, the FPI cavity length), one example implementation may include calculating the direction of the deflection and the absolute deflection. For example, and with reference to FIG. 8, if the FPI-based pressure transducer system is initialized and at point 355 in FIG. 8, it may not be immediately possible to know which fringe or where on the larger interference curve that point lies. Once the pressure starts to increase, however, the detected point 355 starts to move up the curve towards point 310 and then down to the minimum at point 350. In an example implementation, the traversing through such maxima and minima may provide sufficient information to back-calculate the pressure at the original initiation value at point 355. As the pressure increases and the detection point moves to point 315 and then to point 345, such additional information may be utilized, according to an example implementation to further determine the initial starting point with more accuracy. In accordance with an example implementation of the disclosed technology, the deflection range, pressure range, diaphragm thickness and bending stress for the FPI-based pressure transducer may be calculated as described in the previous example with respect to the FPI-based pressure switch.

In accordance with various example implementations of the disclosed technology, FPI-based pressure transducers and/or switches may be configured to handle higher pressures and/or to have higher resolutions. In such example implementations, the amount of total deflection of the FPI cavity may be configured beyond the total 10-microns of deflection as described above. As the deflection increases, certain diffraction effects of the light exiting the fiber may start to affect the values of the intensity maximums and minimums. These diffraction effects can be taken into account by assuming the reflectance of the diaphragm is no longer exactly equal to the reflectance of the optical fiber surface. For example, by letting $R_1$ equal the reflectance of the optical fiber surface and $R_2'$ equal the modified reflectance of the diaphragm that accounts for diffraction effects, equations (7) and (9) become:

$$\frac{I_R^-(d)}{I_0} = \frac{4\sqrt{R_1 R_2'}\sin^2\left(\frac{2\pi n_2 d}{\lambda'}\right)}{\left(1-\sqrt{R_1 R_2'}\right)^2 + 4\sqrt{R_1 R_2'}\sin^2\left(\frac{2\pi n_2 d}{\lambda'}\right)} - \frac{4\sqrt{R_1 R_2'}\sin^2\left(\frac{2\pi n_2 d}{\lambda}\right)}{\left(1-\sqrt{R_1 R_2'}\right)^2 + 4\sqrt{R_1 R_2'}\sin^2\left(\frac{2\pi n_2 d}{\lambda}\right)} \quad (14)$$

$$\frac{I_R^+(d)}{I_0} = \frac{4\sqrt{R_1 R_2'}\sin^2\left(\frac{2\pi n_2 d}{\lambda'}\right)}{\left(1-\sqrt{R_1 R_2'}\right)^2 + 4\sqrt{R_1 R_2'}\sin^2\left(\frac{2\pi n_2 d}{\lambda'}\right)} + \frac{4\sqrt{R_1 R_2'}\sin^2\left(\frac{2\pi n_2 d}{\lambda}\right)}{\left(1-\sqrt{R_1 R_2'}\right)^2 + 4\sqrt{R_1 R_2'}\sin^2\left(\frac{2\pi n_2 d}{\lambda}\right)} \quad (15)$$

and $R_2'$ is given by:

$$R_2' = R_2\left\{\frac{a_f}{a_f + 2d\tan[\sin^{-1}(NA)]}\right\} \quad (16)$$

where $a_f$ is the radius of the optical fiber core, $R_2$ is the reflectance of the diaphragm surface, d is the distance between the reflective surfaces in the optical sensor and NA is the numerical aperture of the optical fiber which is given by:

$$NA = (n_f^2 - n_c^2)^{1/2} \quad (17)$$

where $n_f$ is the index of refraction of the optical fiber core and $n_c$ is the index of refraction of the cladding.

The total normalized additive intensity corrected for diffraction becomes:

$$\frac{I_R^+(d)}{I_0} = \frac{4\sqrt{R_1 R_2\left\{\frac{a_f}{a_f + 2d\tan[\sin^{-1}(NA)]}\right\}}\sin^2\left(\frac{2\pi n_2 d}{\lambda'}\right)}{\left(1-\sqrt{R_1 R_2\left\{\frac{a_f}{a_f + 2d\tan[\sin^{-1}(NA)]}\right\}}\right)^2 + 4\sqrt{R_1 R_2\left\{\frac{a_f}{a_f + 2d\tan[\sin^{-1}(NA)]}\right\}}\sin^2\left(\frac{2\pi n_2 d}{\lambda'}\right)} + \frac{4\sqrt{R_1 R_2\left\{\frac{a_f}{a_f + 2d\tan[\sin^{-1}(NA)]}\right\}}\sin^2\left(\frac{2\pi n_2 d}{\lambda}\right)}{\left(1-\sqrt{R_1 R_2\left\{\frac{a_f}{a_f + 2d\tan[\sin^{-1}(NA)]}\right\}}\right)^2 + 4\sqrt{R_1 R_2\left\{\frac{a_f}{a_f + 2d\tan[\sin^{-1}(NA)]}\right\}}\sin^2\left(\frac{2\pi n_2 d}{\lambda}\right)} \quad (18)$$

The total normalized subtractive intensity corrected for diffraction becomes:

$$\frac{I_R^-(d)}{I_0} = \frac{4\sqrt{R_1 R_2\left\{\frac{a_f}{a_f + 2d\tan[\sin^{-1}(NA)]}\right\}}\sin^2\left(\frac{2\pi n_2 d}{\lambda'}\right)}{\left(1-\sqrt{R_1 R_2\left\{\frac{a_f}{a_f + 2d\tan[\sin^{-1}(NA)]}\right\}}\right)^2 + 4\sqrt{R_1 R_2\left\{\frac{a_f}{a_f + 2d\tan[\sin^{-1}(NA)]}\right\}}\sin^2\left(\frac{2\pi n_2 d}{\lambda'}\right)} - \frac{4\sqrt{R_1 R_2\left\{\frac{a_f}{a_f + 2d\tan[\sin^{-1}(NA)]}\right\}}\sin^2\left(\frac{2\pi n_2 d}{\lambda}\right)}{\left(1-\sqrt{R_1 R_2\left\{\frac{a_f}{a_f + 2d\tan[\sin^{-1}(NA)]}\right\}}\right)^2 + 4\sqrt{R_1 R_2\left\{\frac{a_f}{a_f + 2d\tan[\sin^{-1}(NA)]}\right\}}\sin^2\left(\frac{2\pi n_2 d}{\lambda}\right)} \quad (19)$$

FIG. 9 is a block diagram depicting an example optical pressure switch/transducer system, in accordance with an example implementation of the disclosed technology. In this example embodiment, a first laser 410 may be configured or selected to have a first operating emission wavelength (for example, 800 nm), and the output of the first laser 410 may be input to a first single mode optical fiber 420. In an example implementation, the light from the first laser 410 may enter a 2×1 optical coupler 430. In an example implementation, the system may include a second laser 415, which may be configured or selected to have a second operating emission wavelength (for example, 850 nm) and may be input to a second single mode optical fiber 425. The light from the second laser 415 may also enter the 2×1 optical coupler 430.

In accordance with certain example implementations, one or both of the first laser 410 and/or the second laser 415 may be Fabry-Perot type lasers, for example, to help minimize oscillations in the lasers (by virtue of the spread of wavelengths available). In accordance with an example implementation of the disclosed technology, the operating wavelength can be stabilized by controlling the current provided to the laser and stabilizing the laser temperature using respective thermoelectric controllers 465 and 470. In other example implementations, other wavelength-stabilized lasers can be used, such as Distributed Bragg Reflector lasers and Distributed Feedback lasers. However, Fabry-Perot lasers may have the advantage of being more cost effective.

Returning to the example system shown in FIG. 9, light from both lasers 410 and 415 may enter the 2×1 optical coupler 430 from the respective optical fibers 420 and 425. In an example implementation, 50% of the light from each laser may exit the optical coupler 430 and may be combined into a third optical fiber 435. In an example implementation, the light from the third optical fiber 435 may enter an optical circulator 440 at port number 1 and may exit port number 2 into a fourth optical fiber 455. In accordance with an example implementation of the disclosed technology, the light in fourth optical fiber 455 may continue to the FPI sensor 460, which may be configured as a transducer or a switch, as previously described. In various example implementations, the distance from the optical circulator 440 to the FPI sensor 460 may range from a few meters to a kilometer depending on the application.

In certain example implementations, the interrogation light originating from both lasers 410 and 415 may enter the FPI sensor 460 and may interact with the internal FPI cavity and coupled diaphragm(s) to create an intensity change (as a function of diaphragm deflection) resulting from the interference pattern created within the FPI cavity for each associated wavelength. In an example implementation, the laser light with a modified intensity pattern may exit the FPI sensor 460 and may travel back through the fourth optical fiber 450. This return light may enter the optical circulator 440 at port number 2 and may exit port number 3. The light that exits port number 3 may enter into a fifth optical fiber 475 (i.e., the detector optical fiber) and may be directed to enter a photodetector 445, where it may be detected.

According to an example implementation of the disclosed technology, a circuit 480 or electronic component may be in communication with the photodetector 445. In one example implementation, the circuit may include a processor and memory that may be configured to sample the measurement signal detected by the photodetector 445. In certain example implementations, the circuit 480 may be configured to compensate the measurement signal, for example, based on temperature. In certain example implementations, the circuit 480 may be utilized to disambiguate the measurement signal, for example, based on a comparison with a reference envelope, as discussed with reference to FIG. 7 and FIG. 8. In certain example implementations, one or more of equations (1)-(19) above may be processed by the circuit 480, for example. According to an example implementation of the disclosed technology, the circuit 480 may be utilized to count maxima and or minima (see FIG. 7 and FIG. 8) to determine a quantity of the measurement stimulus). In certain example implementations, hysteresis may be provided via the circuit 480, for example, to eliminate unnecessary switching.

In certain example implementations, the laser current driver and/or thermoelectric controllers 465 and 470 may be in communication with the circuit 480, for example, and may receive controlling signals from the circuit 480. In certain example implementations, the circuit 480 may be utilized to selectively control the laser current driver and/or thermoelectric controllers 465 and 470.

In accordance with an example implementation of the disclosed technology, the light signal entering the photodetector 445 is the addition, summation, or superposition of the interference intensities of the two light beams having different wavelengths, for example, as shown in FIG. 8. As described above, FIG. 8 depicts an example pattern that is produced as the distance between the diaphragm and the reflective surface of the optical fiber in the FPI sensor 460 changes, for example, responsive to external pressure changes. This fringe pattern is a function of d, the interferometric gap spacing (or cavity length), and does not represent any type of wavelength modulation of the lasers. In accordance with an example implementation of the disclosed technology, the lasers may be wavelength-stabilized to prevent or minimize the corresponding output wavelengths from changing during the operation of the FPI sensor 460. In certain example implementations, the intensity of one or more of the lasers 410 and 415 may be controlled by the laser current drivers 465 and 470. In certain example implementations, the laser current drivers 465 and 470 may be set so that the laser intensities are stabilized, and so that the laser intensities of the two lasers are equal to provide for the condition in equations (7) and (9) such that $I_0=I_0'$.

In accordance with an example implementation of the disclosed technology, light reflected back through the system and to the lasers 410 and 415 may be eliminated or minimized to avoid disrupting the laser wavelength control. For example, light reflecting from the photodetector 445 may enter the optical circulator at port number 3 and may exit the circulator at port number 1, and may travel back through the optical coupler 430 into the lasers 410 and 415. The reflections can be reduced, in accordance with an example implementation, by coating the photodetector with an optical thin film antireflection coating for the operation wavelengths (for example, 800 nm and 850 nm). By coating the photodetector with the antireflection coating, light reflecting off the surface of the photodetector may be minimized.

FIG. 10 is a block diagram of an example optical pressure switch/transducer system utilizing a FPI-sensor 460 and an added optical terminator 485 for reducing reflections back through the optical system. In this example implementation, a four port optical circulator 443 is used to redirect the reflected light in the system. For example, light returning from the optical pressure sensor 460 may enter the optical circulator 443 at port number 2 and may exit port number 3 into the detector optical fiber 475 where it may be directed to the photodetector 445. Light reflecting from the optical surface of the photodetector may travel back and enter the optical circulator 443 at port number 3. This reflected light may exit port number 4 and travel along a termination optical fiber 480 into an optical termination 485. In an example implementation, the optical termination 485 may be configured by inserting the termination optical fiber 480 (and/or an attached connector ferrule) into an index matching gel or liquid. In this example implementation, the reflected light may be dispersed within the fluid such that it does not reflect back into the optical fiber and does not enter back into the optical circulator or travel back to the light sources.

FIG. 11 is a block diagram of an example subtractive optical pressure switch/transducer system using a dichroic beamsplitter 490 to separate wavelengths, in accordance with an example implementation of the disclosed technology. The system shown in FIG. 11 may be utilized to produce the subtractive beam fringe output as shown in FIG. 7. In accordance with an example implementation of the disclosed technology, the subtractive optical system may incorporate a dichroic beamsplitter 490 to separate the wavelengths of the combined beams that exit the third port of the circulator 440. In an example implementation, light of the first wavelength (for example, 800 nm) may pass through the dichroic beamsplitter 490 and may enter the first photodetector 445, whereas light of the second wavelength (for example, 850 nm) may be deflected by the dichroic beamsplitter 490 and may enter the second photodetector 495. In accordance with an example implementation of the disclosed technology, the electrical signals from the first photodetector 445 and the second photodetector 495 may be subtracted to produce the fringe pattern shown in FIG. 7. This same approach can be used for optical systems shown in FIGS. 9-10 to transform such systems from a fringe additive optical systems to a fringe subtractive optical systems. The optical systems described herein may further include temperature compensation and/or real-time system calibration.

In an example implementation, and with continued reference to FIG. 11, a photonic crystal (not shown) may be utilized instead of the dichroic beamsplitter 490 to separate the beams that exit the circulator 440. In certain example implementations, the use of photonic crystals may provide an effective and economical alternative to dichroic beam splitters for separating the two different wavelengths for detection. In certain example implementations, polarization control may be utilized in the system to separate the beams based on polarization.

Referring again to FIG. 5, example FPI normalized reflection intensities are shown for two example interrogation light wavelengths (800 nm and 850 nm) as a function of the cavity length of the FPI (for example, the FPI sensor 460 of FIG. 11). In an example implementation, when such two-wavelength interrogation light is utilized for in the system shown in FIG. 11, and when the resulting output beams are separated by the photonic crystal or the dichroic beamsplitter 490, the resulting relative intensity difference between the two wavelengths (as depicted and discussed previously with respect to FIG. 7), at any point on the curve may be utilized to indicate the phase difference of the two wavelengths on the intensity difference curve. In an example implementation, the separate reflection intensity curves (FIG. 5) may be used to disambiguate the waves to determine whether the gap between the reflective surfaces of FPI sensor 460 is increasing or decreasing. Thus, in certain example implementations, measuring the interference patterns produced by each wavelength independently may provide a means of unambiguously knowing the position on the modulation curve, whether it is produced by adding the waves (as shown in FIG. 8) or by subtracting the waves (as shown in FIG. 7).

According to an example implementation of the disclosed technology, by monitoring the relative phase difference between the two interrogation waves (as shown in FIG. 5), the direction of the diaphragm deflection may be determined to provide a direct measure as to whether the pressure is increasing or decreasing. For example, and with reference to FIG. 7, one may use this method to distinguish the difference between moving from point 240 to point 250 and moving from point 240 to point 230. Therefore, according to an example implementation of the disclosed technology, by splitting and separately measuring the two signals corresponding to the two different interrogation wavelengths (FIG. 5), the addition (FIG. 8) and subtraction (FIG. 7) of the waves can be achieved by adding or subtracting the electrical signals coming from the two detectors 445 and 495, as shown in FIG. 11. This technique may be effective for measuring outputs from any type of interferometric sensor including but not limited to pressure switches and pressure transducers.

In certain example implementations, a third optical detector may be utilized to measure an intensity variation signal of a third portion of the interrogation light, and the measurement output signal may be compensated with the intensity variation signal or controlling the interrogation light with the intensity variation signal.

FIG. 12 is a flow diagram of a method 1200, in accordance with an example implementation of the disclosed technology. In block 1202, the method 1200 includes receiving, by a Fabry-Perot Interferometer (FPI) sensor, first interrogation light having a first wavelength and second interrogation light having a second wavelength, wherein the FPI sensor is configured to alter the received first interrogation light, and the second interrogation light responsive to a measurement stimulus. In block 1204, the method 1200 includes detecting, by a first optical detector, a measurement signal responsive to receiving altered first interrogation light and altered second interrogation light from the FPI sensor, the measurement signal corresponding to the measurement stimulus. In block 1206, the method 1200 includes producing a measurement output signal, the measurement output signal representing an intensity of the measurement signal. In block 1208, the method 1200 includes outputting the measurement output signal.

Certain example implementations may include determining a quantity of the measurement stimulus based at least in part on the measurement output signal.

In certain example implementations, the measurement stimulus can include one or more of thermal stimulus, pressure, acceleration, vibration, and force.

According to an example implementation of the disclosed technology, the FPI sensor includes a diaphragm configured to transfer the measurement stimulus to at least a portion of the FPI sensor.

In an example implementation, the measurement output signal represents an intensity sum of the measurement signal.

According to an example implementation of the disclosed technology, the first interrogation light is provided by a first light source, and the second interrogation light is provided by a second light source. Certain example implementations may include selectively controlling one or more of the first light source and the second light source. For example, selectively controlling can include controlling one or more of wavelength output, irradiance output, turning the light source on, and turning the light source off.

Certain example implementations of the disclosed technology can include selectively activating the first light source while selectively deactivating the second light source and outputting a first measurement output signal responsive to activating the first light source. Certain example implementations can include selectively activating the second light source while selectively deactivating the first light source and outputting a second measurement output signal responsive to activating the second light source. Certain example implementations can include determining a difference between the first and second measurement output signal, and determining a quantity of the measurement stimulus based at least in part on the difference.

Some example implementations can include suppressing a reflection of one or more of the first interrogation light and the second interrogation light.

Certain example implementations can include disambiguating a quantity of the measurement stimulus based at least in part on the measurement output signal. For example, the disambiguating can be based on a comparison of one or more maxima or minima of the measurement output signal to a reference envelope, as previously discussed.

FIG. 13 is a flow diagram of a method 1300, in accordance with an example implementation of the disclosed technology. In block 1302, the method 1300 includes receiving, by a Fabry-Perot Interferometer (FPI) sensor, first interrogation light having a first wavelength and second interrogation light having a second wavelength, wherein the FPI sensor is configured to alter the received first interrogation light, and the second interrogation light responsive to a measurement stimulus. In block 1304, the method 1300 includes separating at least a portion of altered first interrogation light from altered second interrogation light. In block 1306, the method 1300 includes detecting, by a first optical detector, a first measurement signal responsive to receiving the separated and altered first interrogation light, wherein the first measurement signal corresponds to the measurement stimulus. In block 1308, the method 1300 includes detecting, by a second optical detector, a second measurement signal responsive to receiving the separated and altered second interrogation light, wherein the second measurement signal corresponds to the measurement stimulus. In block 1310, the method 1300 includes determining a measurement output signal, the measurement output signal representing a sum or difference of the first and second measurement signals. In block 1312, the method 1300 includes outputting the measurement output signal.

Certain example implementations can include determining a quantity of the measurement stimulus based at least in part on the measurement output signal.

According to an example implementation of the disclosed technology, the measurement stimulus includes one or more of pressure, acceleration, vibration, force, and thermal stimulus.

In an example implementation, the first interrogation light is provided by a first light source, and the second interrogation light is provided by a second light source. Certain example implementations can include selectively controlling an output of one or more of the first light source and the second light source.

According to an example implementation of the disclosed technology, selectively controlling the output of one or more of the first light source and the second light source can include controlling one or more of wavelength and irradiance level.

Certain example implementations can include suppressing a reflection of one or more of the first interrogation light and the second interrogation light.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
    receiving, by a Fabry-Perot Interferometer (FPI) sensor, first interrogation light having a first wavelength and second interrogation light having a second wavelength, wherein the FPI sensor is configured to alter the received first interrogation light and the second interrogation light responsive to a measurement stimulus;
    detecting, by a first optical detector, a combined measurement signal responsive to receiving altered first interrogation light and altered second interrogation light from the FPI sensor, the combined measurement signal corresponding to the measurement stimulus;
    producing a combined measurement output signal, the combined measurement output signal representing an intensity of the combined measurement signal;
    comparing one or more maxima or minima of the combined measurement output signal to a reference envelope;
    disambiguating a quantity of the combined measurement stimulus based at least in part on the comparing; and
    outputting the combined measurement output signal.

2. The method of claim 1, further comprising determining a quantity of the measurement stimulus based at least in part on the combined measurement output signal.

3. The method of claim 1, wherein the measurement stimulus comprises one or more of pressure, acceleration, vibration, and force.

4. The method of claim 1, wherein the measurement stimulus comprises a thermal stimulus.

5. The method of claim 1, wherein the FPI sensor comprises a diaphragm, and wherein the diaphragm is configured to transfer the measurement stimulus to at least a portion of the FPI sensor.

6. The method of claim 1, wherein the combined measurement output signal represents an intensity sum of the combined measurement signal.

7. The method of claim 1, wherein the first interrogation light is provided by a first light source, and wherein the second interrogation light is provided by a second light source, and further comprising selectively controlling one or more of the first light source and the second light source.

8. The method of claim 7, wherein selectively controlling comprises controlling one or more of wavelength output and irradiance output.

9. The method of claim 7, further comprising:
selectively activating the first light source while selectively deactivating the second light source;
outputting a first measurement output signal responsive to activating the first light source while the second light source is deactivated;
selectively activating the second light source while selectively deactivating the first light source;
outputting a second measurement output signal responsive to activating the second light source while the first light source is deactivated;
determining a difference between the first and second measurement output signal; and
determining a quantity of the measurement stimulus based at least in part on the difference.

10. The method of claim 1, further comprising suppressing a reflection of one or more of the first interrogation light and the second interrogation light.

11. A method, comprising:
receiving, by a Fabry-Perot Interferometer (FPI) sensor, first interrogation light having a first wavelength and second interrogation light having a second wavelength, wherein the FPI sensor is configured to alter the received first interrogation light and the second interrogation light responsive to a measurement stimulus;
separating at least a portion of altered first interrogation light from altered second interrogation light;
detecting, by a first optical detector, a first measurement signal responsive to receiving the separated and altered first interrogation light, wherein the first measurement signal corresponds to the measurement stimulus;
detecting, by a second optical detector, a second measurement signal responsive to receiving the separated and altered second interrogation light, wherein the second measurement signal corresponds to the measurement stimulus;
determining a measurement output signal, the measurement output signal representing a sum or difference of the first and second measurement signals;
comparing one or more maxima or minima of the measurement output signal to a reference envelope;
disambiguating a quantity of the measurement stimulus based at least in part on the comparing; and
outputting the measurement output signal.

12. The method of claim 11, further comprising determining a quantity of the measurement stimulus based at least in part on the measurement output signal.

13. The method of claim 11, wherein the measurement stimulus comprises one or more of pressure, acceleration, vibration, force, and thermal stimulus.

14. The method of claim 11, wherein the first interrogation light is provided by a first light source, and wherein the second interrogation light is provided by a second light source, and further comprising selectively controlling an output of one or more of the first light source and the second light source.

15. The method of claim 14, wherein selectively controlling the output of one or more of the first light source and the second light source comprises controlling one or more of wavelength and irradiance.

16. The method of claim 11, further comprising suppressing a reflection of one or more of the first interrogation light and the second interrogation light.

17. A system comprising:
a Fabry-Perot Interferometer (FPI) configured to receive a first interrogation light having a first wavelength and second interrogation light having a second wavelength, wherein the FPI is configured to alter the received first interrogation light and the second interrogation light responsive to a measurement stimulus;
a first optical detector configured to detect a measurement signal responsive to receiving altered first interrogation light and altered second interrogation light from the FPI, the measurement signal corresponding to the measurement stimulus; and
at least one electronic component comprising a processor and a memory, the memory having stored thereon an algorithm configured to cause the processor to:
compare one or more maxima or minima of the measurement output signal to a reference envelope;
disambiguate a quantity of the measurement stimulus based at least in part on the comparison; and
output a measurement output signal representing a quantity of the measurement stimulus.

18. The system of claim 17 further comprising:
a first light source configured to produce the first interrogation light; and
a second light source configured to produce the second interrogation light; and
wherein the first wavelength differs from the second wavelength.

19. The system of claim 18, further comprising:
a first controller configured to selectively control the first light source; and
a second controller configured to selectively control the second light source;
wherein selectively controlling comprises controlling one or more of wavelength output and irradiance output.

20. The system of claim 17, wherein the measurement stimulus comprises one or more of thermal stimulus, pressure, acceleration, vibration, and force.

21. The system of claim 17, further comprising a diaphragm in communication with the FPI, and wherein the diaphragm is configured to transfer the measurement stimulus to at least a portion of the FPI.

* * * * *